US008868598B2

(12) United States Patent
Zhang et al.

(10) Patent No.: US 8,868,598 B2
(45) Date of Patent: Oct. 21, 2014

(54) SMART USER-CENTRIC INFORMATION AGGREGATION

(75) Inventors: Jianwen Zhang, Beijing (CN); Zhimin Zhang, Beijing (CN); Jian-Tao Sun, Beijing (CN); Jun Yan, Beijing (CN); Ning Liu, Beijing (CN); Lei Ji, Beijing (CN); Weizhu Chen, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/586,711

(22) Filed: Aug. 15, 2012

(65) Prior Publication Data

US 2014/0052751 A1 Feb. 20, 2014

(51) Int. Cl.
*G06F 7/00* (2006.01)
*G06F 17/30* (2006.01)

(52) U.S. Cl.
USPC .......................................................... 707/769

(58) Field of Classification Search
None
See application file for complete search history.

(56) References Cited

U.S. PATENT DOCUMENTS

| 7,647,332 | B2 | 1/2010 | Van Flandern et al. | |
|---|---|---|---|---|
| 7,693,842 | B2 * | 4/2010 | Hinckley et al. | 707/770 |
| 7,797,635 | B1 * | 9/2010 | Denise | 715/738 |
| 7,908,559 | B1 * | 3/2011 | Denise | 715/738 |
| 8,239,363 | B2 * | 8/2012 | Borton et al. | 707/706 |
| 8,276,101 | B2 * | 9/2012 | Li | 715/863 |
| 8,392,394 | B1 * | 3/2013 | Kumar et al. | 707/706 |
| 8,478,777 | B2 * | 7/2013 | Li et al. | 707/769 |
| 2007/0233692 | A1 * | 10/2007 | Lisa et al. | 707/10 |
| 2008/0250012 | A1 * | 10/2008 | Hinckley et al. | 707/5 |
| 2009/0089678 | A1 | 4/2009 | Sacco et al. | |
| 2009/0193352 | A1 * | 7/2009 | Bunn | 715/780 |
| 2009/0228825 | A1 * | 9/2009 | Van Os et al. | 715/780 |
| 2010/0058416 | A1 | 3/2010 | LaFreniere et al. | |

(Continued)

FOREIGN PATENT DOCUMENTS

| WO | WO0127712 A2 | 4/2001 |
|---|---|---|
| WO | WO0190950 A1 | 11/2001 |

OTHER PUBLICATIONS

Bahrami et al., "Context Aware Information Retrieval for Enhanced Situation Awareness," Proceedings of IEEE Military Communication Conference 2007, Oct. 29, 2007, retrieved at <<http://eprints.ecs.soton.ac.uk/14737/1/Context_Aware_Information_Retrieval_for_Enhanced_SAFinal.pdf>>, 6 pages.

(Continued)

*Primary Examiner* — Robert Beausoliel, Jr.
*Assistant Examiner* — Nicholas Allen
(74) *Attorney, Agent, or Firm* — Carole Boelitz; Micky Minhas; Lee & Hayes PLLC (57) ABSTRACT

A smart user-centric information aggregation system allows a user to define a region of content displayed in a display of a device and performs information aggregation on behalf of the user. The smart user-centric information aggregation system searches, aggregates and groups information related to content included in the region of content for the user while the user can continue to perform his/her original course of actions without interruption. After finding information related to the desired content, the smart user-centric information aggregation system may notify the user and present the found information to the user upon receiving confirmation from the user. The smart user-centric information aggregation system may continue to find new related information and update the presentation with the newly found information periodically, in some instances without user intervention or input.

17 Claims, 5 Drawing Sheets

(56) References Cited

U.S. PATENT DOCUMENTS

| | | | | |
|---|---|---|---|---|
| 2010/0295783 A1* | 11/2010 | El Dokor et al. | | 345/158 |
| 2011/0035406 A1* | 2/2011 | Petrou et al. | | 707/769 |
| 2011/0038512 A1* | 2/2011 | Petrou et al. | | 382/118 |
| 2011/0125735 A1* | 5/2011 | Petrou | | 707/723 |
| 2011/0128288 A1* | 6/2011 | Petrou et al. | | 345/428 |
| 2011/0129153 A1* | 6/2011 | Petrou et al. | | 382/182 |
| 2011/0137895 A1* | 6/2011 | Petrou et al. | | 707/723 |
| 2011/0307461 A1* | 12/2011 | Borton et al. | | 707/706 |
| 2011/0320197 A1 | 12/2011 | Conejero et al. | | |
| 2012/0044179 A1* | 2/2012 | Hudson | | 345/173 |
| 2012/0089582 A1* | 4/2012 | Kumar et al. | | 707/706 |
| 2012/0134590 A1 | 5/2012 | Petrou et al. | | |
| 2012/0197857 A1* | 8/2012 | Huang et al. | | 707/706 |
| 2012/0216114 A1* | 8/2012 | Privault et al. | | 715/702 |
| 2012/0216141 A1* | 8/2012 | Li | | 715/780 |
| 2012/0239642 A1* | 9/2012 | Bliss et al. | | 707/722 |
| 2012/0294520 A1* | 11/2012 | Mei et al. | | 382/164 |
| 2013/0085848 A1* | 4/2013 | Dyor et al. | | 705/14.49 |
| 2013/0103712 A1* | 4/2013 | Li et al. | | 707/769 |

OTHER PUBLICATIONS

Haseloff, "Context Awareness in Information Logistics," published Apr. 12, 2005, retrieved at <<opus.kobv.de/tuberlin/volltexte/2005/944/pdf/haseloff_sandra.pdf>>, 263 pages.

International Search Report and Written Opinion for PCT Application No. PCT/US2013/054583 dated Dec. 16, 2013, 16 pages.

* cited by examiner

THE HOUSING PRICE IN MANHATTAN, NEW YORK WAS DROPPED 10% SINCE JANUARY OF THIS YEAR AMID THE WORSENING ECONOMY OF THE UNITED STATES. INSTEAD OF BUYING A HOUSE, MORE AND MORE PEOPLE ARE RENTING APARTMENTS, SUCH THAT APARTMENT RENTS ARE INCREASING. IN VIEW OF CURRENT ECONOMIC SITUATION, ....

...
...
...

(PLEASE LOG IN FOR FULL ARTICLE)

FIG. 4A

THE HOUSING PRICE IN MANHATTAN, NEW YORK WAS DROPPED 10% SINCE JANUARY OF THIS YEAR AMID THE WORSENING ECONOMY OF THE UNITED STATES. INSTEAD OF BUYING A HOUSE, MORE AND MORE PEOPLE ARE RENTING APARTMENTS, SUCH THAT APARTMENT RENTS ARE INCREASING. IN VIEW OF CURRENT ECONOMIC SITUATION, ....

...
...
...

(PLEASE LOG IN FOR FULL ARTICLE)

FIG. 4B

THE HOUSING PRICE IN MANHATTAN, NEW YORK WAS DROPPED 10% SINCE JANUARY OF THIS YEAR AMID THE WORSENING ECONOMY OF THE UNITED STATES. INSTEAD OF BUYING A HOUSE, MORE AND MORE PEOPLE ARE RENTING APARTMENTS, SUCH THAT APARTMENT RENTS ARE INCREASING. IN VIEW OF CURRENT ECONOMIC SITUATION, ....

...
...
...

(PLEASE LOG IN FOR FULL ARTICLE)

FIG. 4C

THE HOUSING PRICE IN MANHATTAN, NEW YORK WAS DROPPED 10% SINCE JANUARY OF THIS YEAR AMID THE WORSENING ECONOMY OF THE UNITED STATES. INSTEAD OF BUYING A HOUSE, MORE AND MORE PEOPLE ARE RENTING APARTMENTS, SUCH THAT APARTMENT RENTS ARE INCREASING. IN VIEW OF CURRENT ECONOMIC SITUATION, ....

...
...
...

(PLEASE LOG IN FOR FULL ARTICLE)

SMART USER-CENTRIC INFORMATION AGGREGATION

BACKGROUND

Searching and reading information in the Internet has become an important part of daily lives of most people nowadays. A tremendous number of people spend hours to surf the Internet and read information that is of interest to them daily or weekly. In some situations, a user may read a web page and note a particular topic of interest to him/her on the web page. The user may want to obtain more information about this particular topic, and therefore manually perform a search on the Internet using one or more search engines to find other websites or web pages that describe or are relevant to this particular topic.

Although feasible, this mode of "reading and searching" is not only time intensive, but also detracts the user from performing his/her original course of actions (e.g., reading the original web page). Furthermore, in an event that the user has only a limited amount of time for web browsing (e.g., having a few minutes left before boarding a flight), the user may not have enough time to manually search different websites or search engines and locate one or more web pages including content that is of interest to him/her. The user may therefore be forced to quit searching for additional information because of the limited time and because of the tedious work to find additional information that is of interest.

SUMMARY

This summary introduces simplified concepts of smart user-centric information aggregation, which are further described below in the Detailed Description. This summary is not intended to identify essential features of the claimed subject matter, nor is it intended for use in limiting the scope of the claimed subject matter.

This application describes example embodiments of smart user-centric information aggregation. In one embodiment, a search gesture may be detected from a user. The search gesture may define a region of content that is currently displayed in a display of a device. In response to detecting the search gesture, information of interest may be determined based on the region of content. Additionally, in one embodiment, the information of interest may be determined based on context associated with the region of content and/or context associated with an application displaying the content, etc.

Upon determining the information of interest, an information aggregation request may be automatically initiated based on the determined information of interest without interrupting an original course of actions of the user and/or receiving further input from the user. In one embodiment, the information aggregation request may prompt accesses to a plurality of candidate websites to obtain content related to the determined information of interest. Additionally or alternatively, the information aggregation request may be submitted to one or more candidate search engines to retrieve content related to the determined information of interest.

In some embodiments, search results for the information aggregation request may be obtained. The search results may include content extracted and/or downloaded from the plurality of websites and/or one or more search engines that are found to be related to the determined information of interest. In one embodiment, the search results may be organized into a plurality of groups according to respective websites from which the search results are obtained, respective classes (e.g., news, blogs, reviews, etc.) and/or respective formats (text, video, audio, image, etc.) of information to which the search results belong.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, existing modes of reading and searching are not only time intensive, but also interrupts the user from performing his/her original course of actions (e.g., reading an original web page). If the user has only a limited time for web browsing (e.g., having a few minutes before boarding a flight), the user may be forced to quit searching the Internet for finding information of interest to him/her.

This disclosure describes a smart user-centric information aggregation system, which enables a user to perform a search without leaving a current application or current session (e.g., reading or editing a text document in a text editor), and gathers information for the search from the Internet or specific locations on behalf of the user. The smart user-centric information aggregation system allows the user to continue his/her original course of actions, such as continuing to read the text document, while the smart user-centric information aggregation system aggregates and organizes search results (e.g., in the background) for the user.

In one embodiment, the smart user-centric information aggregation system may detect a search gesture from a user that defines or annotates a region of content displayed in a current application (e.g., a web browser application) of a client device. In response to detecting the search gesture from the user, the smart user-centric information aggregation system may formulate a search query based on the region of content, and perform a search based on the search query while the user continues to perform his/her original task, for example, reading a web page on the web browser application. In one embodiment, the smart user-centric information aggregation system may submit the search query to one or more search engines and/or access one or more websites on behalf of the user.

In response to obtaining or retrieving search results from the one or more search engines and/or websites, in some embodiments, the smart user-centric information aggregation system may organize the search results for presentation to the user. For example, the smart user-centric information aggregation system may organize the search results into a plurality of groups according to respective websites from which the search results are obtained, respective formats (video, audio, text, image, etc.) of the search results and/or respective classes (news, blogs, reviews, etc.) of search results. Additionally or alternatively, the smart user-centric information aggregation system may provide the (organized) search results to the current application for presentation to the user. In one embodiment, the search results may include content extracted and/or downloaded from one or more websites that are related to the region of content, and/or summarization of related content of the one or more websites, and the like.

In one embodiment, after presenting the search results related to the information of interest to the user, the smart user-centric information aggregation system may further periodically or continuously aggregate new content or information related to the information of interest, and update (augment) the search results with newly found content with or without instruction and/or intervention of the user.

The described system enables a user to search for information without leaving a current application or quitting a current work task, and gathers information from one or more search engines and/or websites for presentation to the user. By doing so, the described system saves the user from manually searching and gathering the information from various search engines and/or websites.

In the examples described herein, the smart user-centric information aggregation system detects a search gesture from a user, formulates a search query and performs a search based on the search query on behalf of the user, retrieves and organizes search results for presentation to the user, periodically updates the search results with newly found content. However, in other embodiments, these functions may be performed by multiple separate systems or services. For example, in one embodiment, a detection service may detect a search gesture from the user, while a separate service may formulate a search query and perform a search for the user, and yet another service may retrieve and organize search results for presentation to the user, and periodically update the search results with newly found content.

Furthermore, although in the examples described herein, the smart user-centric information aggregation system may be implemented as a service provided in a server over a network, in other embodiments, the smart user-centric information aggregation system may be implemented in a form of a plug-in or add-on program to the current application. Furthermore, in some embodiments, the smart user-centric information aggregation system may be implemented as a background process or application providing support to a plurality of client applications (e.g., a web browser application, a text editor application, a news application, etc.). Additionally or alternatively, in some embodiments, the smart user-centric information aggregation system may be one or more services provided by one or more servers in a network or in a cloud computing architecture.

The application describes multiple and varied implementations and embodiments. The following section describes an example environment that is suitable for practicing various implementations. Next, the application describes example systems, devices, and processes for implementing a smart user-centric information aggregation system.

Exemplary Environment

Figure 1:
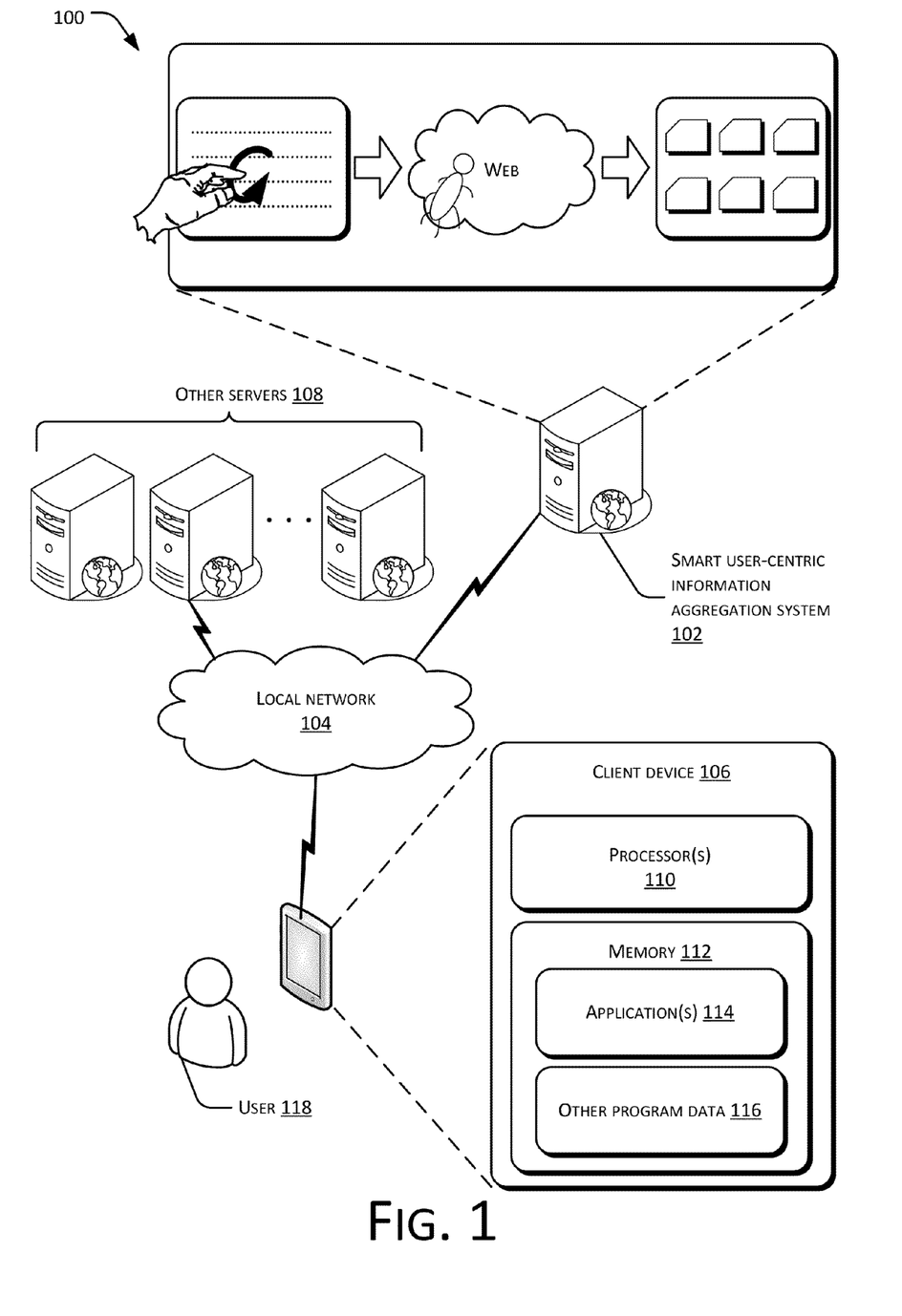
FIG. 1 illustrates an example environment including an example smart user-centric information aggregation system.

FIG. 1 illustrates an exemplary environment 100 that implements a smart user-centric information aggregation system 102. In one embodiment, the environment 100 may include a network 104 and a client device 106. In some embodiments, the environment 100 may further include other servers 108, which may include one or more website servers, search engines and/or third-party servers. The device 106 may communicate data with the smart user-centric information aggregation system 102 and/or the other servers 108 via the network 104.

Although in this example, the smart user-centric information aggregation system 102 is described to be a system separated from the client device 106, in some embodiments, functions of the smart user-centric information aggregation system 102 may be included and distributed among the client device 106 and/or the other servers 108. For example, the device 106 may include part of the functions of the smart user-centric information aggregation system 102 while other functions of the smart user-centric information aggregation system 102 may be included in one or more other servers 108. Furthermore, in some embodiments, the smart user-centric information aggregation system 102 may be included in one or more third-party servers, e.g., other servers 108, that may or may not be a part of a cloud computing system or architecture.

The client device 106 may be implemented as any of a variety of conventional computing devices including, for example, a mainframe computer, a server, a notebook or portable computer, a handheld device, a netbook, an Internet appliance, a tablet or slate computer, a mobile device (e.g., a mobile phone, a personal digital assistant, a smart phone, etc.), etc. or a combination thereof.

The network 104 may be a wireless or a wired network, or a combination thereof. The network 104 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

In one embodiment, the device 106 includes one or more processors 110 coupled to memory 112. The memory 112 includes one or more applications or services 114 (e.g., web applications or services, text editor applications or services, etc.) and other program data 116. The memory 112 may be coupled to, associated with, and/or accessible to other devices, such as network servers, routers, and/or the other servers 108.

In one embodiment, a user 118 may be using an application 114 on the client device 106 to perform a task, such as reading a web page describing a city using a web browser application. The user 118 may note a particular festival event in that city and may be interested in knowing more information about this particular festival event that may be of diverse classes and/or formats, such as blogs related to this festival event, its schedule, surrounding points of attraction, images or videos of festival event in past years, etc. The user 118 may select or define a region of content (which includes a name of that particular festival event, for example) in the web page by performing a selection gesture, for example, a touch input using a finger or pointing device to bound or substantially bound the region of content displayed in a display of the client device 106.

In response to detecting the selection gesture from the user, the smart user-centric information aggregation system 102 may formulate and submit a search query based on the region of content with or without intervention and/or further input from the user 118. Upon obtaining search results that are relevant or related to the particular festival event, for example, the smart user-centric information aggregation system 102 may organize and provide the search results to the application 114 or a new window or user interface for presentation to the user 118. The user 118 may then browse the search results at his/her convenient time without interrupting an original course of actions of the user 118.

Figure 2:
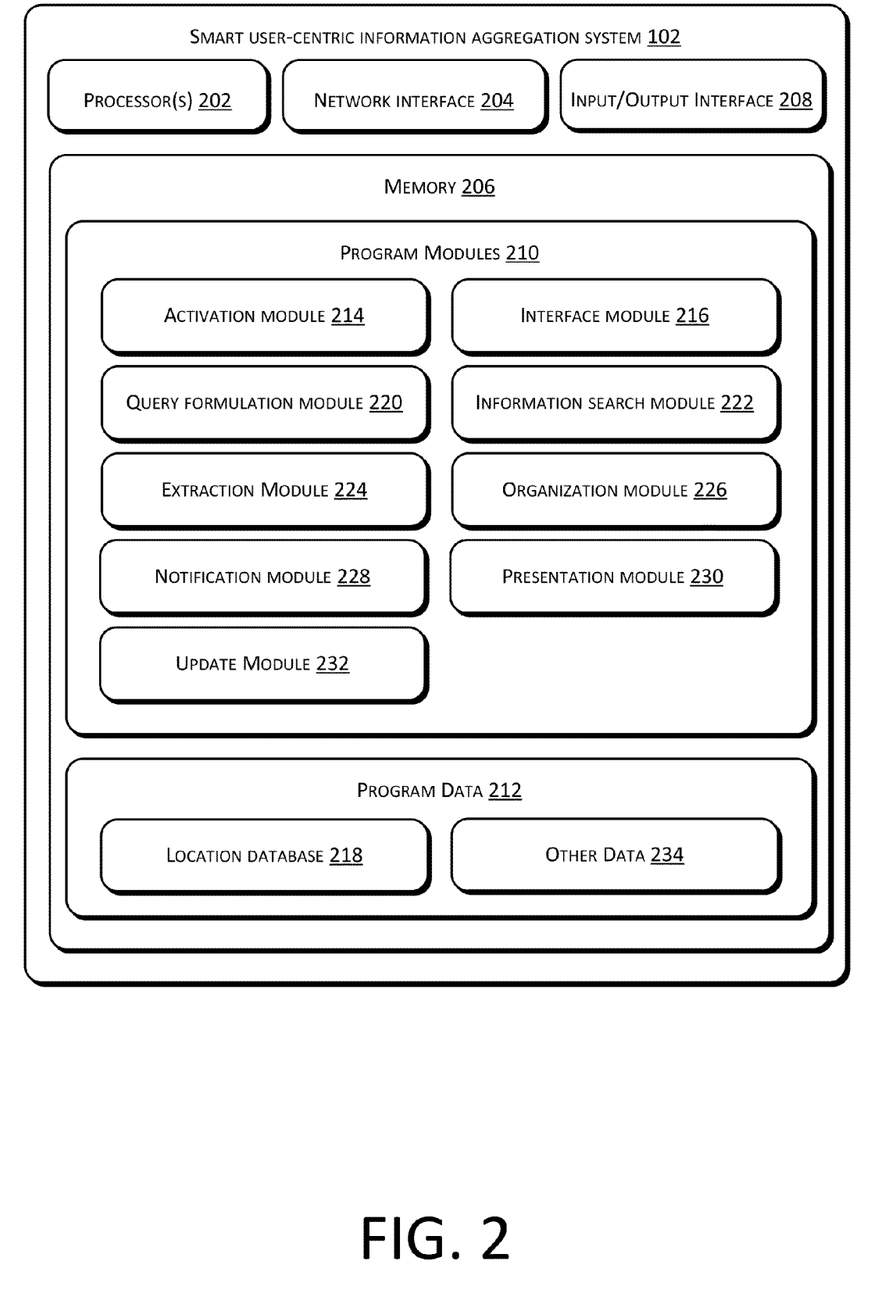
FIG. 2 illustrates the example smart user-centric information aggregation system of FIG. 1 in more detail.

FIG. 2 illustrates the smart user-centric information aggregation system 102 in more detail. In one embodiment, the smart user-centric information aggregation system 102 includes, but is not limited to, one or more processors 202, a network interface 204, memory 206, and an input/output interface 208. The processor(s) 202 is configured to execute instructions received from the network interface 204, received from the input/output interface 208, and/or stored in the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the smart user-centric information aggregation system 102 may include an activation module 214. For example, prior to using the smart user-centric information aggregation system 102 to gather or collect information on behalf of the user 118, the user 118 may need to activate the smart user-centric information aggregation system 102 in the first place. In one embodiment, the activation module 214 may emulate a soft control (such as a button, an icon, etc.) in the application 114 (e.g., a web browser application, etc.) for allowing the user 118 to activate the smart user-centric information aggregation system 102. Additionally or alternatively, the activation module 214 may allow the user 118 to associate a hard control (such as a physical button, for example) of the client device 106 with activation of the smart user-centric information aggregation system 102. Additionally or alternatively, the activation module 214 may enable the user 118 to use a predetermined voice command (e.g., "OBoard", "smart information aggregation", etc.) to activate the smart user-centric information aggregation system 102.

Upon receiving an indication of activating the smart user-centric information aggregation system 102 from the user 118, the activation module 214 activates the smart user-centric information aggregation system 102 or an interface module 216 of the smart user-centric information aggregation system 102 to listen for user gesture or input through the client device 106. The user gesture or input may include inputs providing content and/or context for information aggregation to be performed by the smart user-centric information aggregation.

In one embodiment, the user 118 may perform a selection gesture to select a region of content that is displayed in a display of the client device 106. For example, the selection gesture may include a touch input on a touch screen or a touch pad of the client device 106, a motion of a cursor controlled by a user input device (such as a mouse, a pen, etc.) associated with the client device 106, and/or a body motion using an image capture device associated with the client device 106.

Additionally, in one embodiment, the search gesture may include using a finger and/or a user input device (e.g., a mouse, a stylus, a digital pen, etc.) to define the region of content to be used as an input for information aggregation. In one embodiment, the selection gesture may define the region of content by bounding or substantially bounding a region within the content displayed in the client device 106.

Figure 3:
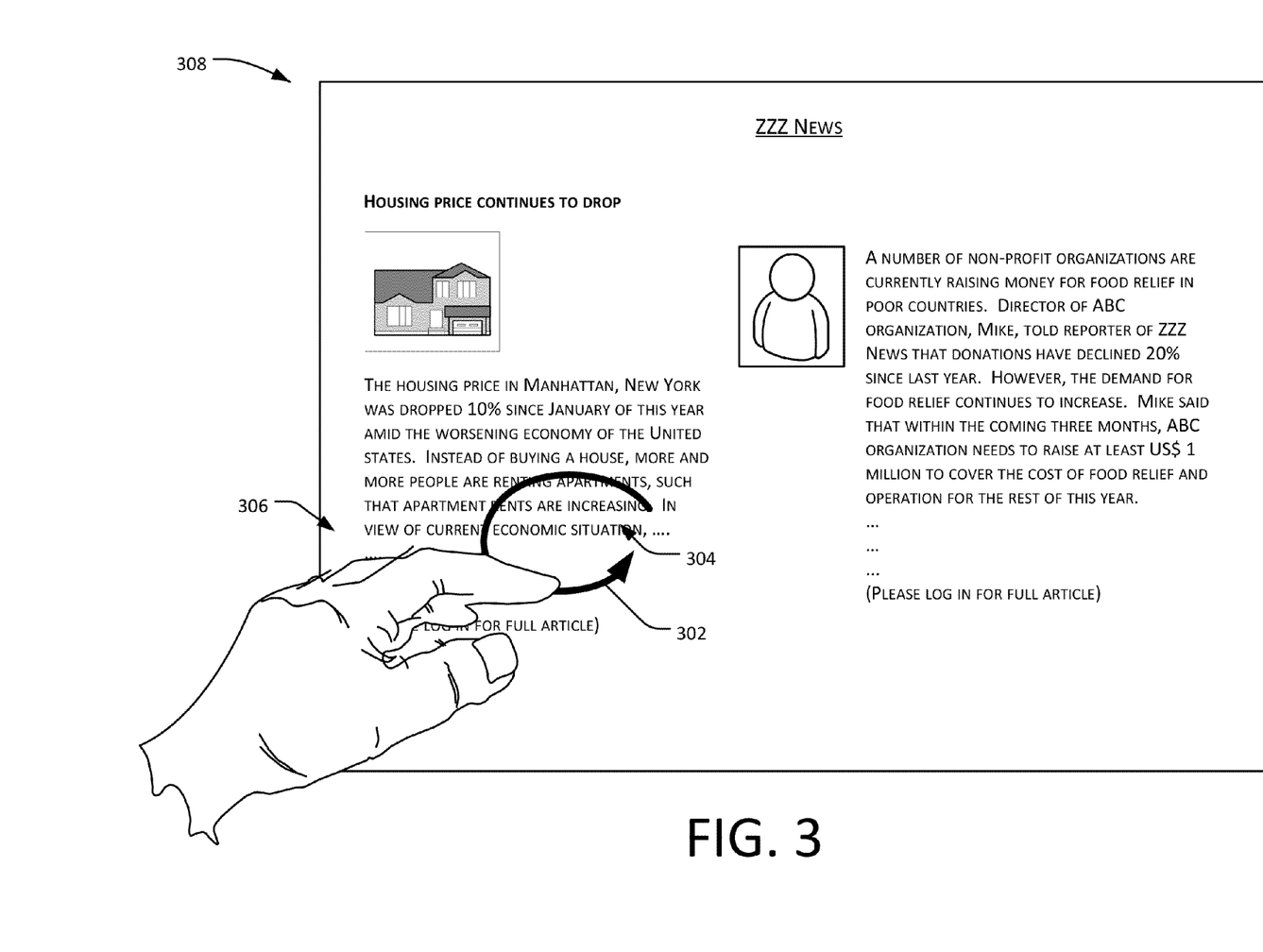
FIG. 3 illustrates an example selection gesture for initiating information aggregation.

FIG. 3, for example, illustrates an example selection gesture for initiating a session of information aggregation. The selection gesture as shown in FIG. 3 may include a substantially circular or elliptical motion 302 to define a region of content 304 by bounding or substantially bounding a region within the content 306 as displayed in the display 308 of the client device 106.

Figure 4A:
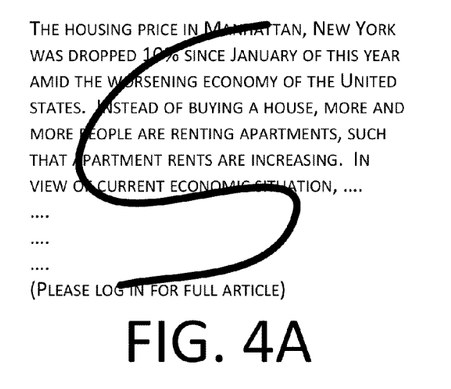
FIG. 4A-4D illustrate other example selection gesture for initiating information aggregation.
Figure 4B:
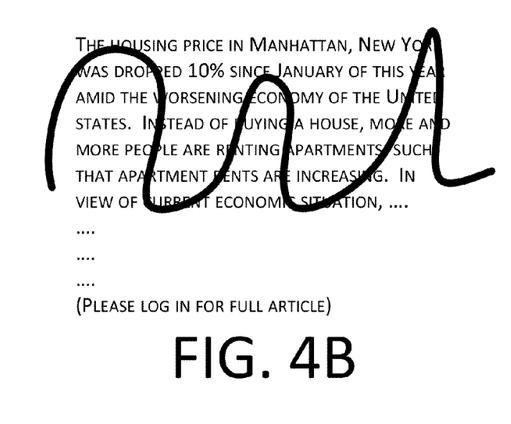
Figure 4C:
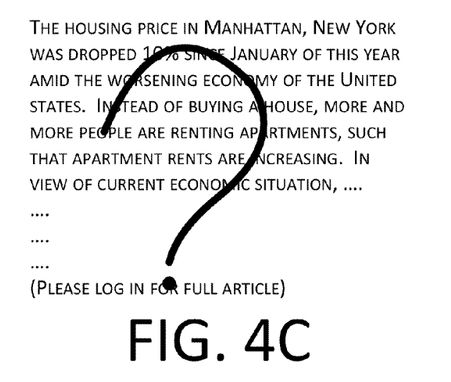
Figure 4D:
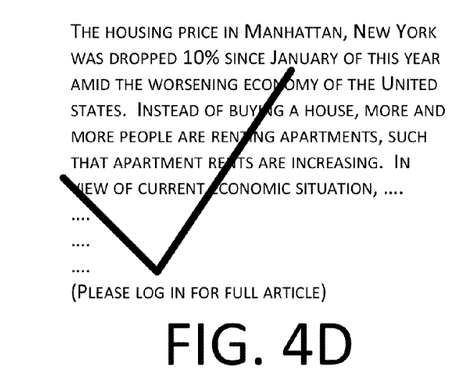

FIG. 4A-4D, meanwhile, illustrates other example selection gestures that may be used to initiate a session of information aggregation. FIG. 4A illustrates an example generally S-shaped gesture which defines a region of content by touching or overlapping the region of content. FIG. 4B illustrates an example squiggle gesture that also defines a region of content by touching or overlapping the region of content. FIG. 4C illustrates an example question mark-like search gesture. The question mark-like gesture of FIG. 4C may define a region of content by touching or overlapping the content or by substantially bounding the content. Furthermore, the user 118 may place a dot at the end of the gesture in order to indicate that certain content should be accorded a higher weight when the smart user-centric information aggregation system 102 formulates a query for an associated information search or aggregation. FIG. 4D illustrates an example checkmark gesture that also defines a region of content by touching or overlapping the region of content.

Additionally or alternatively, the selection gesture may include a voice input from the user 118. The user 118 may provide content for information aggregation by voicing the content (e.g., "Space Needle in Seattle") to the interface module 216 of the smart user-centric information aggregation system 102 through a microphone of the client device 106.

In some embodiments, the interface module 216 may further obtain context associated with the content (e.g., the region of content defined by the selection gesture or the content described in the voice input) for information aggregation. For example, the interface module 216 may analyze and/or obtain part or all of the content displayed in the application 114 including the region of content defined by the selection gesture. Additionally or alternatively, the interface module 216 may analyze and/or obtain part or all of the content displayed in the application 114 of focus (i.e., the application 114 that was at the point of focus of the user 114 shortly before the user provides the selection gesture).

Additionally or alternatively, the interface module 216 may provide a prompt (in form of a new window, a voice prompt, etc.) to the user 118, asking the user 118 whether he/she wants to provide a context for the information aggregation. Additionally or alternatively, the interface module 216 may ask the user 118 what class (news,logs, reviews, etc.)

and/or format (text, video, image, audio, etc.) of information the smart user-centric information aggregation system 102 may aggregate or collect for the user 118. The interface module 216 may also allow the user 118 to provide a context associated with the content for the information aggregation, a class and/or a format of the information to be aggregated or collected on his/her own initiative by, for example, providing a visible control on the application 114 for the user 118 to select upon activation of the smart user-centric information aggregation system 102.

Additionally or alternatively, the interface module 216 may allow the user 118 to provide one or more candidate websites and/or search engines to be used for this current information aggregation. For example, the interface module 216 may provide a user interface such as a window to the client device 106 for presentation to the user 118. In one embodiment, the user 118 may input addresses of one or more candidate websites and/or search engines from which information is searched and aggregated in the user interface. Additionally or alternatively, the interface module 216 may allow the user 118 to input a name or an incomplete name or keyword for a website or search engine from which the information is to be aggregated. For example, the user 118 may not remember an address of a website (e.g., online.wsj.com), but may remember a full or partial name or symbol associated with the website (e.g., "Wall Street", "Wall Street Journal" or "WSJ", etc.). The interface module 216 may allow the user 118 to input an entire or partial name or symbol associated with the website (e.g., Wall Street) and find the address of the website for the user 118. In one embodiment, the interface module 216 may provide the address and/or the entire name of the website to the user 118 for confirmation or correction. Upon confirmation from the user 118, the interface module 216 may use this website for information aggregation.

The interface module 216 may also dynamically determine one or more candidate websites and/or search engines for the user 118 to select. By way of example and not limitation, the interface module 216 may determine one or more candidate websites and/or search engines based on the content included or described in the region of content and/or the voice input. Additionally or alternatively, the interface module 216 may determine one or more candidate websites and/or search engines based on the context associated with the content included or described in the region of content and/or the voice input. Upon receiving a selection of a website and/or search engine from the user 118, the smart user-centric information aggregation system 102 may perform the associated information aggregation primarily or strictly using the selected website and/or search engine.

In some instances, the interface module 216 may allow the user 118 to input one or more classes and/or format of information to be aggregated and provide one or more suggestions of websites and/or search engines to be used for this information aggregation. Upon receiving a selection of a suggested website and/or search engine, the smart user-centric information aggregation system 102 may perform the associated information aggregation primarily or strictly using the selected website and/or search engine. Additionally or alternatively, the smart user-centric information aggregation system 102 may automatically and dynamically determine one or more websites and/or search engines to be used for this information aggregation without input from the user 118. Additionally, in one embodiment, the interface module 216 may store the candidate websites and/or search engines that are predetermined by the user 118 and/or dynamically determined by the interface module 216 in a location database 218 for future use by the user 118 and/or the smart user centric information aggregation system 102.

In some embodiments, the interface module 216 may obtain other information from the client device 106 and/or the user 118. For example, the interface module 216 may obtain certain personal information of the user 118 with consent of the user 118. The personal information of the user 118 to be obtained may include a current location of the user 118 (through a global positioning system associated with the client device 106 or an input about the current location from the user 118), demographic information about the user 118, past browsing history or search history associated with the user 118, and the like. The interface module 216 may render these classes of information as part of the context for consideration in information aggregation as described in the foregoing description.

In some embodiments, after the user 118 provides the selection gesture, the context, the class and/or the format of information to be aggregated to the interface module 216, the user 118 may perform other operations or continue his/her original operation (such as reading a document) while the smart user-centric information aggregation system 102 searches, gathers and groups related information in the background. For example, in one embodiment, the user 118 may perform one or more other selection gestures to provide one or more contents as inputs to the smart user-centric information aggregation system 102 for other sessions of information aggregation. Additionally or alternatively, the user 118 may continue to perform his/her original task or operation (such as continuing to read a story in a web browser application, for example) without distraction or interruption.

In one embodiment, in response to detecting the selection gesture from the user 118, the interface module 216 may obtain or collect information associated with the selection gesture, including content within the region of content and/or described in the voice input. Additionally, the interface module 216 may also obtain information about context associated with the region of content (and/or the voice input), class and format of information to be aggregated, and/or information about one or more candidate websites and/or search engines from which desired information is to be aggregated as described in the foregoing description.

Upon obtaining all or part of the above information, the interface module 216 may send this information to a query formulation module 220. The query formulation module 220 may analyze the information received from the interface module 216 and formulate a query based on the received information. In one embodiment, the query formulation module 220 may render part or all of the content included in the region of content and/or described in the voice input as information of interest to the user 118. For example, if the content included in the region of content includes a text, the query formulation module 220 may render the text as a keyword or keyword vector used for searching and/or matching content relevant or related to the information of interest. If the content included in the region of content includes a multimedia content such as an image, the query formulation module 220 may perform recognition (e.g., image recognition if the multimedia content is an image) and determine the information or interest from the multimedia content. For example, if the multimedia content is an image of a Space Needle in Seattle, the interface module 216 may (tentatively) determine that the information of interest is "Space Needle in Seattle" through image recognition.

Additionally or alternatively, the query formulation module 220 may analyze the content included in the region of content (and/or the voice input) and determine a theme or the information of interest to the user 118. Additionally, in some embodiments, the query formulation module 220 may further analyze the context associated with the region of content to determine the information or content of interest to the user 118. In one embodiment, the query formulation module 220 may render the determined information or content of interest as a query to be submitted for information aggregation.

In one embodiment, upon determining the information or content of interest to the user 118, an information search module 222 may access and crawl the one or more candidate websites and/or search engines previously determined by the user 118 and/or dynamically determined by the smart user-centric information aggregation system 102. For instance, the information search module 222 may employ one or more web crawlers to crawl and obtain web pages of the one or more candidate websites and/or search engines that are potentially relevant or related to the formulated query or the information of interest. The module 222 may also compare the query or the information of interest to content in the crawled web pages. In one embodiment, the information search module 222 may compare the query or the information of interest to the content included in the crawled web pages using the keyword or the keyword vector obtained in the content described in the region of content and/or the voice input from the user 118. In one embodiment, the information search module 222 may obtain a similarity or confidence score by matching the keyword or the keyword vector with the content in each crawled web page as an indication of respective relevancy to the query or the information of interest associated with the information aggregation for the user 118.

Additionally or alternatively, in some embodiments, the information search module 222 may send the query to the one or more candidate websites and/or search engines previously determined by the user 118 and/or dynamically determined by the smart user-centric information aggregation system 102 (or the interface module 216). The information search module 222 may retrieve or extract one or more web pages including related information or content for the information of interest from the one or more candidate websites and/or search engines.

Additionally or alternatively, the information search module 222 may visit or access the websites and/or search engines, and look for one or more web pages relevant or related to the information or content of interest of the user 118. In one embodiment, the information search module 222 may obtain a predetermined number of first M highest ranked web pages returned from respective websites and/or search engines, wherein M is a positive integer. In one embodiment, M may be the same or different for each website and/or search engine, and may be determined by the user 118 and/or the smart user-centric information aggregation system 102. The information search module 222 may compare the query or the information of interest to the content included in these web pages using the keyword or the keyword vector obtained in the content described in the region of content and/or the voice input from the user 118. In one embodiment, the information search module 222 may obtain similarity or confidence scores by matching the keyword or the keyword vector with the content in these web pages as indications of respective relevancy to the query or the information of interest associated with the information aggregation for the user 118.

In response to finding one or more web pages of the websites and/or search engines that are related to the determined information of interest, the smart user-centric information aggregation system 102 or an extraction module 224 may extract or download part or all of content included in the one or more found web pages from the websites and/or search engines as search results for the query. For example, the extraction module 224 may identify or positioning one or more target areas related to the search query, the determination information of interest, the class and/or the format of information desired by the user 118 in the search results. The extraction module 224 may extract or download part or all of content from a subset of the target areas included in the search results.

Additionally or alternatively, in one embodiment, the extraction module 224 may extract or download part or all of content from a subset of the one or more found web pages of the websites and/or search engines). For example, the extraction module 224 may extract or download part or all of content from a predetermined number of the one or more found web pages that have the first N highest similarity or confidence scores, where N is a positive integer predetermined by the user 118 or the smart user-centric information aggregation system 102.

Upon extracting or downloading the part or all of target areas or found web pages of the websites and/or search engines (i.e., the search results for the query), the smart user-centric information aggregation system 102 may include an organization module 226 to organize the search results based on one or more criteria. In one embodiment, the organization module 226 may group the search results into a plurality of groups according to the websites and/or the search engines from which the search results are extracted or obtained. Additionally or alternatively, in some embodiments, the organization module 226 may group the search results into a plurality of groups according to respective information classes (such as news, blogs, reviews, etc.). Additionally or alternatively, the organization module 226 may group the search results into a plurality of groups according to respective formats including, for example, text, audio, video, image, etc. Additionally or alternatively, in some embodiments, the organization module 226 may group the search results into a plurality of groups according to a criterion predefined by the user 118. In some embodiments, the smart user-centric information aggregation system 102 may leave the search results as is without organizing or grouping them. Additionally or alternatively, each of the plurality of groups may correspond to a particular class of information and/or a particular website that is different from the rest of the plurality of groups. Additionally or alternatively, each of the plurality of groups may be stored under a particular folder that is different from the rest of the plurality of groups Additionally or alternatively, the organization module 226 may recommend some of the organized search results to the user 118. For example, the organization module 226 may select a predetermined number of search results (in each group, among the plurality of groups, among the unorganized search results, etc.) having the first K highest similarity or confidence scores, where K is a positive integer. The organization module 226 may recommend these search results to the user 118. Additionally or alternatively, in one embodiment, the organization module 226 may recommend the first K websites having the most number of web pages relevant or related to the information of interest to the user 118.

In some instances, the organization module 226 may analyze the search results (i.e., the content of the found web pages) and summarize information included in the search results. For example, the organization module 226 may summarize content of a related web page, content of related web pages associated with a same website, content of related web pages providing a same class (news, reviews, blogs, etc.) of information, etc. The organization module 226 may provide a summary, an abstract or a representative excerpt thereof to the user 118, enabling the user 118 to quickly determine whether to dive in to consume (e.g., read, watch, listen, etc.) content of the related web page or website in further detail.

Regardless of whether the search results are organized or not, in one embodiment, the smart user-centric information aggregation system 102 may optionally include a notification module 228 to notify the user 118 that the search results for this information aggregation are ready for presentation to the user 118. The notification module 228 may notify the user 118 of the presence of the search results through one or more notifications. For example, the notification module 228 may present a notification message on the display of the client device 106 to notify the user 118 of the presence of the search results. Additionally or alternatively, the notification module 228 may present a change in an attribute (such as a color of a frame, for example) of the application 114 (which may be the same application from which the region of content is defined by the selection gesture or another application that is currently used by the user 114), a specific sound, etc., to notify the user 118 of the presence of the search results. Additionally or alternatively, the notification module 228 may display a folder or an icon (which may provide a link to a folder or window of aggregated results or content) in the display of the client device 106 and annotate this folder or icon as the aggregated content obtained for this information aggregation. The user 118 may open the folder or select the icon to view the aggregated content.

Upon notifying the user 118 of the search results for this session of information aggregation and/or displaying the folder or icon in the display of the client device 106, the smart user-centric information aggregation system 102 or the interface module 216 may wait or listen for an input from the user 118. If the user 118 decides to read the aggregated content, the user 118 may click or select the folder or icon. In one embodiment, in response to receiving a selection of the folder or icon from the user 118, the smart user-centric information aggregation system 102 or a presentation module 230 may present a new window or board for displaying the organized search results (or summaries, excerpts thereof) to the user 114. The user 118 may select desired content to read at his/her convenient time or location.

In some embodiments, the presentation module 230 may enable the client device 106 or one or more relevant applications 114 for presenting the organized search results to the user 118. By way of example and not limitation, the presentation module 230 may format and/or store the organized search results in one or more formats and/or files compatible with one or more applications 114 of the client device 106 for presentation to the user 118. Upon formatting and/or storing the organized search results, the presentation module 230 or the smart user-centric information aggregation system 102 may leave the one or more applications 114 the responsibility of presenting the organized search results to the user with or without further intervention.

In one embodiment, the one or more applications 114 may include an application designated by the user 118 at the beginning of the information aggregation. Additionally or alternatively, the one or more applications 114 may include the application in which the region of content is defined by the selection gesture. Additionally or alternatively, the one or more applications 114 may include an application that is designated by the smart user-centric information aggregation system 102. For example, the smart user-centric information aggregation system 102 may designate a specific application for presentation of the organized search results based on one or more classes and/or formats of the search results. For example, if the search results include video and text, the presentation module 230 may designate a video player for presenting the video and a text editor application for presenting the text. Alternatively, the presentation module 230 may designate a web browser application for presenting both the video and the text to the user 118. The presentation module 230 may indicate which one or more applications 114 of the client device 106 include part or all of the organized search results to the user 118 through, for example, the notification message as described in the foregoing description.

In one embodiment, the smart user-centric information aggregation system 102 may further include an update module 232, which periodically or continuously tracks changes in the content (e.g., content of the found web pages) related to the information of interest for the user 118. For example, the user 118 may be interested in a specific product and indicate his/her intention of knowing its price and/or price change over time to the smart user-centric information aggregation system 102 or the interface module 216. Alternatively, the smart user-centric information aggregation system 102 or the query formulation module 220 may infer this intention of the user 118 based on the content and/or the context associated with the region of content defined by the selection gesture of the user 118 (or described in the voice input of the user 118). The update module 232 may then periodically or continuously track the found web pages or the candidate websites (and/or the search engines) to detect or determine whether a price change is observed. In response to detecting an occurrence of a price change, the update module 232 may record this price change and associated web page or website, and notify the presentation module 230 of this price change for notifying the user 118. For example, the presentation module 230 may notify the user immediately, at a time designated by the user 118, or at a time designated by the smart user-centric information aggregation system 102 (e.g., when the user 118 turns on the client device 106, opens the application 114 displaying the search results provided by the presentation module 230, etc.).

In some embodiments, the update module 232 may search or crawl additional or new content from the Internet or from the candidate websites and/or search engines that are relevant or related to the information of interest. In one embodiment, the update module 232 may periodically or continuously search or crawl additional or new content related to the information of interest according to a time range and/or time interval manually set by the user 118 (e.g., at the beginning of the information aggregation or after receiving or reading the search results, etc.). Additionally or alternatively, the update module 232 may periodically or continuously search or crawl additional or new content related to the information of interest according to a time range and/or time interval automatically set by the smart user-centric information aggregation system 102, such as checking for updates in every 10 minutes, every hour, etc., within a day, for example.

In response to finding new content that is related to the information of interest, the update module 232 may provide this new related content to the presentation module 230. The presentation module 230 may then present the new related content to the user 118 using a new window or one or more relevant applications 114 of the client device as described in the foregoing description.

In one embodiment, the smart user-centric information aggregation system 102 may further include other data 234. The other data 234 may store the information of interest of the user 118, associated information (e.g., the context, the candidate websites and/or search engines, etc.) of this information of interest and/or the aggregated results, and the like. The smart user-centric information aggregation system 102 may employ this information in the other data 234 for future information aggregation, data mining and/or customization associated with the user 118.

Exemplary Methods

Figure 5:
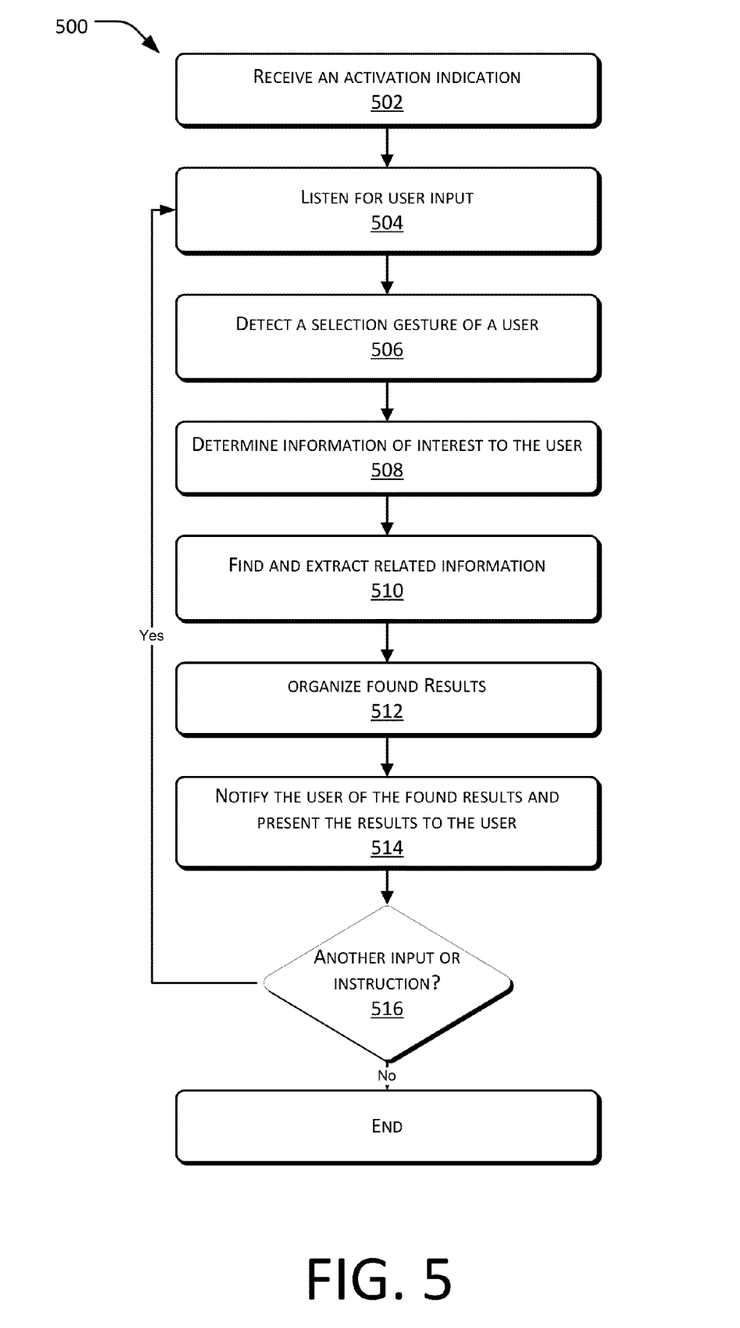
FIG. 5 illustrates an example method of information aggregation.

FIG. 5 is a flow chart depicting an example method 500 of information aggregation. The method of FIG. 5 may, but need not, be implemented in the environment of FIG. 1 and using the system of FIG. 2. For ease of explanation, method 500 is described with reference to FIGS. 1 and 2. However, the method 500 may alternatively be implemented in other environments and/or using other systems.

Method 500 is described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The exemplary method is illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 5, at block 502, the smart user-centric information aggregation system 102 receives an activation indication from the user 118 through the client device 106.

At block 504, in response to receiving the activation indication, the smart user-centric information aggregation system 102 waits for an input from the user 118.

At block 506, the smart user-centric information aggregation system 102 detects a selection gesture from the user 118. The selection gesture defines a region of content that is displayed in the display of the client device 106. The smart user-centric information aggregation system 102 may further obtain other information including context information, personal information of the user 118, information about candidate websites and/or search engines, etc.

At block 508, the smart user-centric information aggregation system 102 determines information of interest to the user 118 and/or formulates a search query based on the content and/or the context associated with the region of content defined by the selection gesture.

At block 510, the smart user-centric information aggregation system 102 accesses, crawls and searches the candidate websites and/or search engines to find and extract content that is relevant or related to the information or interest or the search query.

At block 512, the smart user-centric information aggregation system 102 organizes the found content based on one or more criteria defined by the user 118 and/or the smart user-centric information aggregation system 102. The one or more criteria may include, but are not limited to, organizing the found content according to respective websites from which the found content is obtained, organizing the found content according to respective classes and/or formats of the found content, etc.

At block 514, the smart user-centric information aggregation system 102 notifies the user 118 of the found content, and presents the found content to the user 118 in response to receiving an instruction from the user 118, for example, receiving a selection of a folder or icon associated with a notification message or the found content.

At block 516, the smart user-centric information aggregation system 102 waits for another input or instruction from the user 118.

Although the above acts are described to be performed by the smart user-centric information aggregation system 102, one or more acts that are performed by the smart user-centric information aggregation system 102 may be performed by the client device 106 or other software or hardware of the client device 106 and/or any other computing device (e.g., the server 108). For example, the client device 106 may detect a selection gesture from the user 118 and send content and/or context associated with a region of content defined by the selection gesture to a server 108. The server 108 may then analyze the content and/or the context, formulate a search query based thereon, crawl or access websites and/or search engines to collect information desired by the user 118. Upon finding and collecting the information desired by the user 118, the server 108 may return the found information to the client device 106, which may then organize and present the found information to the user 118 through an application 114 of the client device 106.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. One or more computer storage media storing computer-executable instructions that, when executed by one or more processors, configure the one or more processors to perform acts comprising:

detecting a search gesture from a user, the search gesture defining and substantially bounding a region of content that is displayed on a device;

in response to detecting the search gesture, formulating a search query based on the region of content defined by and substantially bounded by the search gesture;

providing a first user interface for the user of the device to specify at least one website or search engine;

submitting the search query to obtain content related to the search query from the at least one website or search engine specified by the user;

receiving search results corresponding to the at least one website or search engine specified by the user based on the search query;

positioning target areas related to the search query in web pages returned in the search results;

extracting content from the target areas in the returned web pages, the extracted content being grouped into a plurality of groups, wherein each of the plurality of groups corresponds to a particular class of information related to the search query and/or the at least one website or search engine specified by the user that is different from the rest of the plurality of groups, and wherein each of the plurality of groups is stored under a particular folder that is different from the rest of the plurality of groups;

providing a second user interface comprising a plurality of indicators, each of the plurality of indicators representing a group of the plurality of groups;

receiving a selection gesture from the user to select a particular indicator of the plurality of indicators; and providing content associated with a group of the plurality of groups represented by the particular indicator.

2. The one or more computer storage media as recited in claim 1, the acts further comprising continuously or periodically receiving additional search results based on the search query based on a user input.

3. The one or more computer storage media as recited in claim 2, the acts further comprising adding the additional search results into respective groups of the plurality of groups.

4. A method comprising:

under control of one or more processors configured with executable instructions stored in computer storage media:

detecting a search gesture from a user of the device, the search gesture defining a region of content that is displayed on a device; providing a user interface for the user of the device to specify at least one website or search engine;

determining information of interest based at least on the region of content defined by the search gesture;

initiating an information aggregation request based on the determined information of interest in response to completion of the search gesture, the information aggregation request for content related to the determined information of interest from the at least one website or search engine specified by the user;

receiving search results based on the information aggregation request, the search results corresponding to the at least one website or search engine specified by the user that are related to the determined information of interest;

extracting content from web pages included in the received search results; and grouping the extracted content into a plurality of groups, wherein each of the plurality of groups corresponds to a particular class of information related to the region of content.

5. The method as recited in claim 4, further comprising determining context associated with the content displayed in the device, wherein determining the information of interest is further based on the determined context.

6. The method as recited in claim 4, further comprising determining one or more classes associated with the information of interest, wherein the at least one website or search engine specified by the user corresponds to websites serving the information of interest of the one or more determined classes.

7. The method as recited in claim 4, wherein the search gesture comprises:

detecting a body motion using an image capture device coupled to the device.

8. The method as recited in claim 4, wherein the region of content defined by the search gesture comprises a region that is substantially bounded by the search gesture.

9. The method as recited in claim 4, further comprising providing a second user interface for presenting the search results to the user, the second user interface comprising a plurality of indicators, each indicator representing a visual collection of content associated with a particular class of information or the at least one website or search engine specified by the user related to the information of interest.

10. The method as recited in claim 9, further comprising:

receiving a selection gesture from the user to select an indicator of the plurality of indicators; and in response to receiving the selection gesture, providing content associated with the selected indicator for presentation to the user.

11. The method as recited in claim 9, further comprising continuously or periodically receiving additional search results for the information aggregation request without a user input.

12. The method as recited in claim 11, further comprising adding the additional search results under respective indicators of the plurality of indicators for presentation to the user in response to detecting selection of respective indicators by the user.

13. A system comprising: one or more processors;

memory communicatively coupled to the one or more processors, the memory storing executable instructions that, when executed by the one or more processors, configure the one or more processors to perform acts comprising:

receiving a search gesture from a user defining a region of content that is displayed on a client device;

providing a first user interface for the user of the client device to specify at least one website or search engine;

submitting a search query to the at least one website or search engine specified by the user, wherein the search query is based on the region of content;

receiving search results corresponding to the at least one website or search engine specified by the user for the search query;

extracting content from the at least one website or search engine specified by the user returned in the received search results;

grouping the extracted content into a plurality of groups, wherein each of the plurality of groups corresponds to a particular class of information related to the search query;

providing at least one of the plurality of groups of the extracted content from the search results for presentation on a second user interface;

continuously or periodically receiving additionally search results for newly discovered information related to the search query without an additional user input; and updating the user interface based on the additional search results.

14. The system as recited in claim 13, the acts further comprising providing a plurality of indicators in the user interface, each of the plurality of indicators representing a group of the plurality of groups.

15. The system as recited in claim 14, the acts further comprising:

receiving a selection gesture from the user to select an indicator of the plurality of indicators; and in response to receiving the selection gesture, providing search results associated with a group represented by the selected indicator for presentation to the user.

16. The system as recited in claim 13, wherein the at least one website or search engine specified by the user includes additional websites that are dynamically determined by an application responsible for formulating the search query.

17. The one or more computer storage media as recited in claim 1, wherein the acts further comprise: generating a full name of the at least one website or search engine based on a partial name or symbol provided in the first user interface by the user of the device.

* * * * *